United States Patent [19]

Wilson et al.

[11] Patent Number: 5,781,360
[45] Date of Patent: Jul. 14, 1998

[54] METHOD AND APPARATUS FOR DETECTING DATA TRACK MISREGISTRATION

[75] Inventors: Rosser S. Wilson, Menlo Park; Peter Butler, Santa Clara, both of Calif.

[73] Assignee: Maxtor Corporation, Longmont, Colo.

[21] Appl. No.: 373,461

[22] Filed: Jan. 17, 1995

Related U.S. Application Data

[63] Continuation of Ser. No. 722,118, Jun. 26, 1991, abandoned.

[51] Int. Cl.$^6$ ............................................. G11B 5/596
[52] U.S. Cl. ........................ 360/77.08; 360/77.04; 360/77.02
[58] Field of Search ..................... 360/77.04, 77.08, 360/77.11, 77.05, 77.02; 307/261, 350

[56] References Cited

U.S. PATENT DOCUMENTS

| | | | |
|---|---|---|---|
| 3,364,365 | 1/1968 | Eisenhauer | 307/261 |
| 4,412,165 | 10/1983 | Case et al. | 318/636 |
| 4,488,187 | 12/1984 | Alaimo | 360/77.08 |
| 4,530,019 | 7/1985 | Penniman | 360/77.08 |
| 4,530,020 | 7/1985 | Sutton | 360/77.04 |
| 4,536,809 | 8/1985 | Sidman | 360/77.04 |
| 4,594,622 | 6/1986 | Wallis | 360/77.04 |
| 4,814,909 | 3/1989 | Brown et al. | 360/78.07 |
| 4,860,135 | 8/1989 | Cain | 360/97.02 |
| 4,872,074 | 10/1989 | Brown et al. | 360/77.07 |
| 4,878,135 | 10/1989 | Makino et al. | 360/78.04 |
| 4,890,172 | 12/1989 | Watt et al. | 360/77.04 |
| 4,907,109 | 3/1990 | Senio | 360/78.04 |
| 4,920,462 | 4/1990 | Couse et al. | 360/78.04 |
| 5,109,502 | 4/1992 | Sasamoto et al. | 395/425 |
| 5,115,359 | 5/1992 | Sidman | 360/77.05 |
| 5,185,681 | 2/1993 | Volz et al. | 360/77.04 X |
| 5,187,620 | 2/1993 | Notake et al. | 360/77.04 |
| 5,208,711 | 5/1993 | Kitamura et al. | 360/77.05 X |

FOREIGN PATENT DOCUMENTS

| | | |
|---|---|---|
| 0 238 318 | 9/1987 | European Pat. Off. . |
| 0 267 669 A2 | 5/1988 | European Pat. Off. . |
| 2-201784 | 8/1990 | Japan . |
| 2-254687 | 10/1990 | Japan . |

OTHER PUBLICATIONS

Paton, A., "Correction of Data Track Misregistration in Servo Controlled Disk Files", vol. 17, No. 6, Nov. 1974, IBM Technical Disclosure Bulletin.

*Primary Examiner*—Aristotelis Psitos
*Assistant Examiner*—James T. Wilson
*Attorney, Agent, or Firm*—Sheridan Ross P.C.

[57] ABSTRACT

Apparatus for detecting data track misregistration is described. The present invention involves the interaction of a microprocessor with a demodulator. Microcode within the microprocessor initiates a misregistration scan of all data tracks at specific intervals to generate a calibration offset table that is used to direct the heads during the subsequent interval. A demodulator obtains the peak values of calibration servo bursts, displaced one-half of the track width to either side of a track, and outputs a timing pulse proportional to their respective peak voltage values. A timer within the microprocessor extracts the time values, and the misregistration displacement is calculated by the comparison of the inner burst and outer burst time values. The calculated displacement is used in the offset table for subsequent disk references.

10 Claims, 7 Drawing Sheets

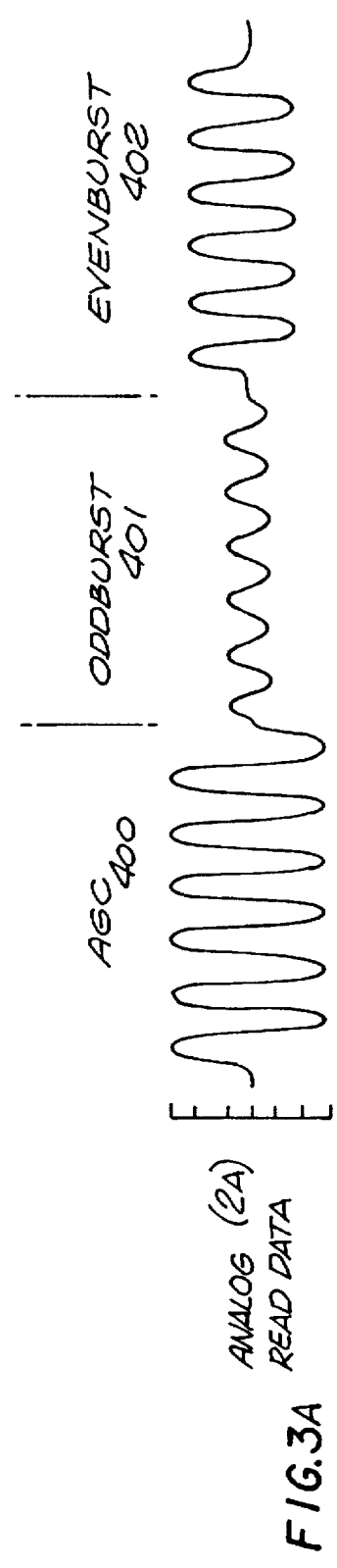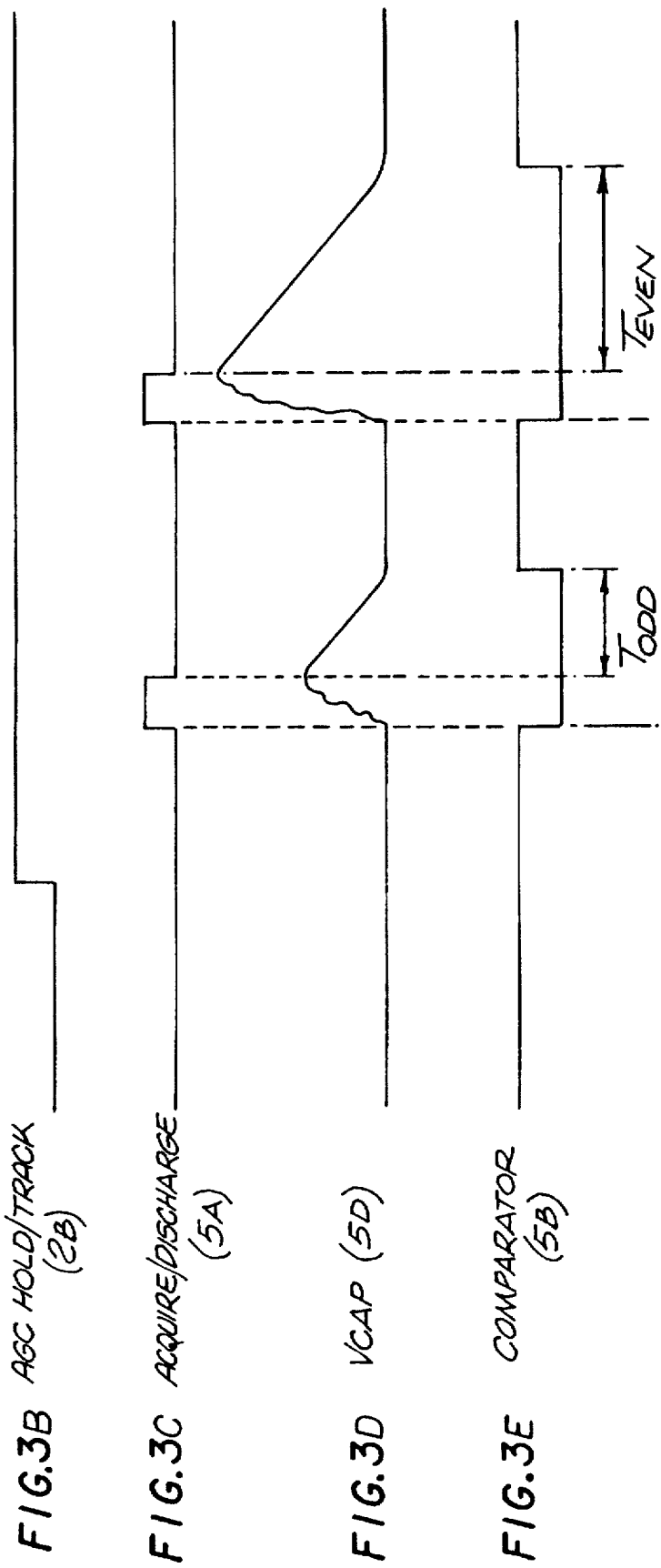

METHOD AND APPARATUS FOR DETECTING DATA TRACK MISREGISTRATION

This is a continuation of application Ser. No. 07/722,118 filed on Jun. 26, 1991, now abandoned.

BACKGROUND OF THE PRESENT INVENTION

1. Field of the Invention

This invention relates to the field of magnetic disk files and more specifically to the field of data track misregistration detection.

2. Background Art

In a typical rotating medium as a storage system, data is stored on magnetic or magneto optic disks in a series of concentric "tracks." These tracks are accessed by read/write head that detects variations in the magnetic orientation of the disk surface.

The read/write head moves back and forth, radially or angularly, on a disk under control of a head-positioning servo mechanism so that it can be selectively positioned over a selected one of the tracks. Once in position over a track, the servo mechanism causes the head to trace a path which follows the center line of the selected track.

In a magnetic disk file containing multiple information storage surfaces, at least one recording head is uniquely associated with each surface. It is common for head positioning to consist of a synchronous operation in which all heads are moved in a similar manner by a single apparatus. Such an apparatus is illustrated in FIGS. 7 and 8.

FIGS. 7 and 8 illustrate side views of the head/disk assembly shown in FIG. 1. FIG. 7 shows a single disk system; FIG. 8 exhibits a multiple disk implementation. Data storage disks 1 are aligned on a common spindle axis for rotational purposes. One side of one disk is dedicated to servo information (101); all other surfaces comprise data surfaces 100. All data heads 1B and the single servo head 1D are manipulated simultaneously by positioning apparatus 700, under the control of an actuator (voice-coil motor 3 in FIG. 1).

The apparatus (700) provides for synchronized radial or angular movement of the heads (1B, 1D) across the surfaces (100, 101) of the disks (1). Thus, when one head is seeking a specific track, all heads are simultaneously positioned over the associated track on their respective surfaces.

Servo position reference information stored on at least one disk surface is used to provide position information to the disk drive servo system. Based on the position information, the servo system directs the positioning apparatus to center the heads over the correct tracks.

As track densities increase, misregistration of data heads with their corresponding tracks can become a problem in disk files employing servo position reference information physically separate from the data surfaces, as is the case with a dedicated servo scheme. In a dedicated servo scheme, one surface is entirely devoted to servo information. Data track locations are registered at the associated sites on the servo surface. This scheme provides for continuous position referencing. Positioning of all heads is accomplished in accordance with the servo information extracted from the single servo surface by the servo head.

Static and slowly-varying misregistration can occur due to thermal gradients, mismatch of thermal expansion coefficients of the materials from which the actuator and spindle are fabricated, and slip of bolted joints.

Attempts have been made in the past to compensate for misregistration solely by mechanical means. U.S. Pat. No. 4,860,135 to Cain is an example of this approach. In Cain a magnetic disk memory data storage device has a unitary arm assembly mounted for rotation by an actuator for carrying the transducers and shifting them across the disk surfaces. Due to the presence of multiple heat sources in the device, the assembly is subjected to varying temperature during normal device operation which causes differential rotation of the individual arms and consequent misalignment of them.

To compensate for thermal expansion, a slot is placed in the edge of an arm and a cylinder consisting of a material with a smaller thermal coefficient is placed in the slot in an interference fit. The cylinder tends to counteract the misalignment arising from the temperature change by causing the tension under which the edge of the arm in which the cylinder is placed to decrease as temperature increases and increase as temperature decreases.

Electrical detection of static misregistration is also known in the prior art. Essential to many misregistration detection means is a servo pattern located on every data surface. This servo pattern is accessed to measure the amount of track misregistration that occurs on that surface. U.S. Pat. Nos. 4,530,019 to Penniman and 4,530,020 to Sutton describe suitable servo patterns.

U.S. Pat. No. 4,530,019 to Penniman describes a sector format including, in their respective order, an erase gap, an automatic gain control (AGC) information burst, a first burst of servo control information, a second burst of servo control information, and user data. The first and second servo control information bursts are written alternately off track by one-half of the track separation between the track of interest and the next adjacent tracks to each side thereof. This sectorized servo format enables the apparatus to perform head-to-track alignment checks every sector. This sectorized format unnecessarily restricts the data storage capacity of the disk surface.

U.S. Pat. No. 4,530,020 to Sutton describes a runout correction pattern similar to the pattern described in the patent to Penniman. Sutton, however, produces the servo pattern as an integer number of sequentially recorded erase gaps, AGC bursts and servo bursts along track 0; no data is stored on this track. Decoding of the runout correction patterns by a positionally fixed playback transducer establishes runout correction information which may be provided to control, as a function of rotational angle of the disk, the servo mechanism adjusting the playback transducer position during playback of the data stored on the disk.

The purpose for having alternating servo bursts displaced one-half of the track width to each side is to provide signal amplitudes indicative of the amount of misregistration. An apparatus is used to sense the amplitude of each servo burst. For a head tracking too much to one side of the track, the bursts aligned along the side closest to the head position will read as a stronger signal and the servo bursts aligned on the side away from the head will read as a weaker signal.

There are several patents describing apparatus designed for the purpose of detecting track misregistration utilizing this type of servo pattern. In general, these designs are complex and comprise peak detector, multiple sample-and-hold circuits, multiplexer elements and an analog to digital converter.

U.S. Pat. Nos. 4,814,909 and 4,872,074 to Brown et al. describe a transducer position control system comprising these elements. On the four innermost and outermost tracks of a data surface, the first sector after each track index marker contains servo bursts offset as previously described. A peak detector receives the burst signals as input and provides the peak voltage to two sample-and-hold circuits.

The sample-and-hold circuits are triggered such that one circuit contains the peak value of a first burst and the other circuit contains the peak value of a second burst. On an alternating basis, each of the held burst values is selected by an analog data selector and provided to an analog to digital converter. The converter provides the digital value to the microprocessor which then calculates the amount of misregistration by comparing subsequent bursts. A disadvantage of the invention of Brown is its complexity, requiring double peak detectors, sample-and-hold circuits, and an analog-to-digital converter.

A digitally implemented apparatus is described in the U.S. Pat. No. 4,488,187 assigned to Alaimo. The apparatus of Alaimo comprises a digital demodulator which serves as a servo counter to provide a microprocessor with a binary offset count. The servo pattern used in this apparatus comprises a first group of digital pulses offset towards one side of track center, with each succeeding pulse offset by a decreasing distance, and a second group of digital pulses offset to the other side of track center, with each succeeding pulse offset by an increasing distance. The demodulator counts the number of pulses read by the recording head. The count produced by each group of pulses indicates the amount of misalignment between the data track and recording head. A disadvantage of this digital detection scheme is that the writing of the servo pulses requires a complex servo writing method and apparatus.

U.S. Pat. No. 4,412,165 to Case et al describes a sector servo position control system in which the position signals are derived from the servo samples with the head constrained in the correct on track position. The value of each of these position error signals is then stored as a digital number, forming part of a correcting byte in the data section immediately proceeding the associated faulty sample. The servo loop comprises a demodulator, analog to digital converter, digital controller, timing logic block, digital to analog converter and sample and hold circuitry.

U.S. Pat. No. 4,594, 622 to Wallis describes a track following servo system for a disk file that is improved by the feeding forward of a prediction of track eccentricity into the normal feedback control loop. The eccentricity related function is derived by combining functions of the position error signal and of the input signal to the head position actuator.

U.S. Pat. No. 4,878,135 to Makino et al. describes a head positioning system for use with a magnetic disk with outer, middle and inner servo tracks which are radially separated by data tracks. The circuitry employs a quadratic compensation function for determining the offset correction value.

U.S. Pat. No. 4,890,172 to Watt et al. describes a method for automatically calibrating gain parameters of a servo control. The method generally comprises a step of encoding AB bursts on at least one special calibration track of a disk surface. Servo correction number information is also encoded on the calibration track to compensate for the off-center pattern of the AB burst. A digital signal processing technique is performed on a correction signal derived from the AB burst and servo correction information to detect a residual signal at the preselected frequency of the off-center pattern signal. The gain of the track position detector is adjusted to minimize the magnitude of the residual signal.

U.S. Pat. No. 4,907,109 to Senio describes a magnetic disk drive system having automatic offset and gain adjustment means. The magnetic disk drive includes units that, immediately upon receipt of a power supply and before receipt of a seek command, measure one or more position offset values along one or more cylinders on a magnetic disk. This is done by detecting the control current when the position of the magnetic head is controlled under the fine position control, and calculating one or more offset correction values.

U.S. Pat. No. 4,920,462 to Couse et al. describes a disk drive fine servo velocity control and method for head positioning relative to a disk. During a seek operation, servo velocity control circuitry seeks out the destination track and places the head within the boundaries of that track while the servo position control circuitry, using servo information places the head on the centerline of the destination track. The fine servo control circuitry is provided for communicating the information generated by the servo position control circuitry to the servo velocity circuitry when the head is several tracks from the destination track in order to allow the actuator to smoothly and quickly cause the head to seek within the boundaries of the destination track without overshooting that track.

SUMMARY OF THE PRESENT INVENTION

The apparatus for detecting data track misregistration of the present invention involves the interaction of a microprocessor with a demodulator. Microcode within the microprocessor periodically initiates a misregistration scan of fixed calibration tracks on the data surfaces at selected intervals to generate a calibration offset table that is used to compensate misregistration of data heads during the intervening interval.

Misregistration is detected by reading information bursts in the calibration areas. These bursts are written under the control of an interface controller to overlap three adjacent tracks. A first type of burst overlaps the inside and middle tracks. A second type of burst overlaps the middle and outside tracks. The demodulator of the present invention obtains the peak values of these bursts and outputs a timing pulse proportional to their respective peak voltage values. A timer within the microprocessor measures the time values, and the misregistration displacement is calculated by the comparison of the inner burst and outer burst time values. The calculated displacement is used in the offset table for subsequent disk references. The invention circumvents the need for a dedicated analog-to-digital converter and multiplexing switch.

BRIEF DESCRIPTION OF DRAWINGS

FIG. 3 illustrates signal waveforms within the servo demodulator of the present invention.

DETAILED DESCRIPTION OF THE INVENTION

A system for data track misregistration detection comprising a demodulator operating in tandem with a microprocessor is described. The invention may be used for thermal misregistration and low-frequency offset correction in disk files employing a dedicated servo surface. In the following description, numerous specific details, such as gain values, specific circuit elements, etc. are described in detail in order to provide a more thorough description of the present invention. It will be apparent, however to one skilled in the art, that the present invention may be practiced without these specific details. In other instances, well known features have not been described in detail so as not to obscure the present invention.

In the present invention, a thermal compensation demodulator receives analog information in a differential format from an associated recording channel and provides a binary timing signal to a microprocessor. A software idle loop continually checks for commands on the disk interface while maintaining a timer which governs frequency of access to the misregistration calibration area. At specific intervals (i.e. 5 minutes), or at an interval determined by the expected rate of change of misregistration, an access to the calibration area is made. Each data head is selected sequentially and the demodulator is cycled to measure the misregistration value. A table, indexed by head, is constructed holding misregistration data. When a read or write command to a specific head is received, the table is interrogated. If the misregistration value obtained from the table is within a preset threshold range of the current position of the head, no head position correction is made and the operation proceeds normally. However, if misregistration is outside the threshold boundary, an appropriate position offset is introduced in the servo prior to the execution of the read or write command. Initiation of the offset command may be delayed until the servo has repositioned the head. Separate thresholds can be employed for write and read commands. The use of thresholds permits latency reduction, since it obviates head repositioning when misregistration is small.

Figure 1:
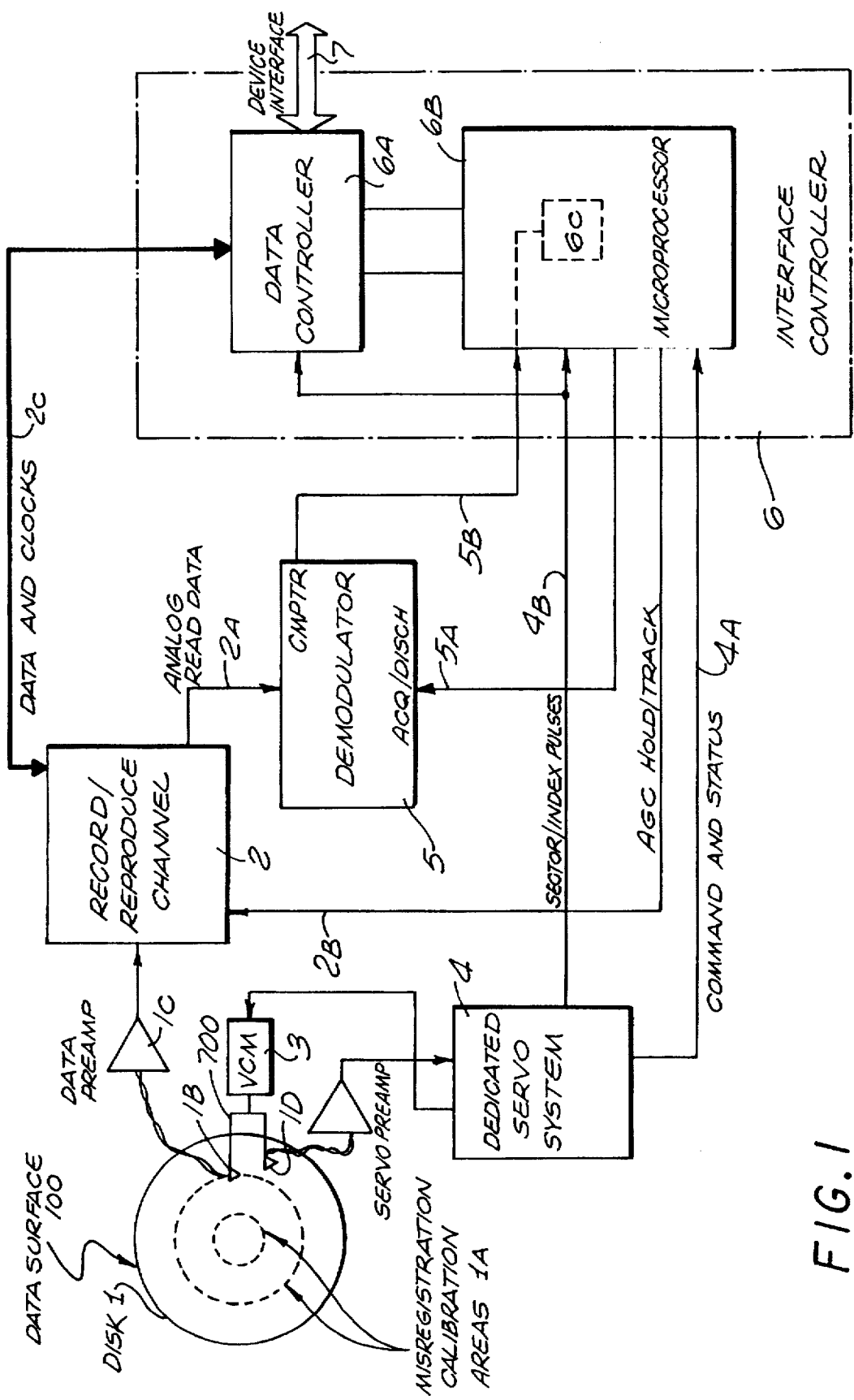
FIG. 1 illustrates the servo environment of the present invention.

Application of the invention to measurement and correction of track misregistration of data heads relative to a calibration track is the subject of FIG. 1. Data storage disks 1 contain surfaces for storage of customer data (100), as well as a servo position-reference surface (not shown) for storing information used by a dedicated servo. Misregistration calibration areas 1A are recorded at appropriate locations on all data surfaces 100. These are typically located in the outer guardband regions of the data surfaces, and are accessed periodically to gauge the amount of track misregistration on each data-surface recording head 1B. The dedicated servo system 4 controls head positioning through voice-coil motor 3 and positioning apparatus 700. Servo system 4 receives commands and presents status to interface controller 6 over a serial communication link on cable 4A. An important capability of the servo system is its ability to offset head position in marginal increments. This capability is utilized both in the initial writing of calibration tracks 1A, and in subsequent head repositionings to restore track misregistration. The servo system also delivers index and sector pulses to interface controller 6 over wires 4B. The number of sectors into which a track is divided may be altered by an appropriate command transmitted on cable 4A.

Record/reproduce channel 2 performs data encoding, detection, and clocking functions of a disk file and communicates with interface controller 6 over cable 2C. Data preamplifier 1C amplifies the signal output of the data surface recording 1B to a level suitable for application to the reproduce channel. The reproduce channel includes an automatic gain control (AGC) hold feature which permits acquisition of a specific gain value, and retention of that value.

Wire 2B selects AGC acquisition or hold mode, and is controlled by microprocessor 6B. The AGC hold mode is invoked solely when reading misregistration calibration areas 1A.

Demodulator 5 receives analog reproduce data in a differential format on wires 2A, after this data has been filtered and subjected to AGC control in record channel 2. Comparator output 5B from the demodulator cooperates with event capture timer 6C in microprocessor 6B, and with demodulator mode control signal 5A to permit demodulation of calibration track information.

Interface controller 6, comprising data controller 6A and microprocessor 6B, governs communication between the disk file and a standardized device interface over cable 7. This interface can be, for example of the SCSI or PC/AT type. Use of a high-level interface is essential in implementing track misregistration calibration schemes, as it allows periodic accesses to calibration data, and any necessary recording head offset operations, to be effectively obscured from the customer. The interface controller 6 writes misregistration calibration areas 1A in a special sequence, thereby avoiding the requirement that these tracks be written by an expensive servo writer.

Figure 5:
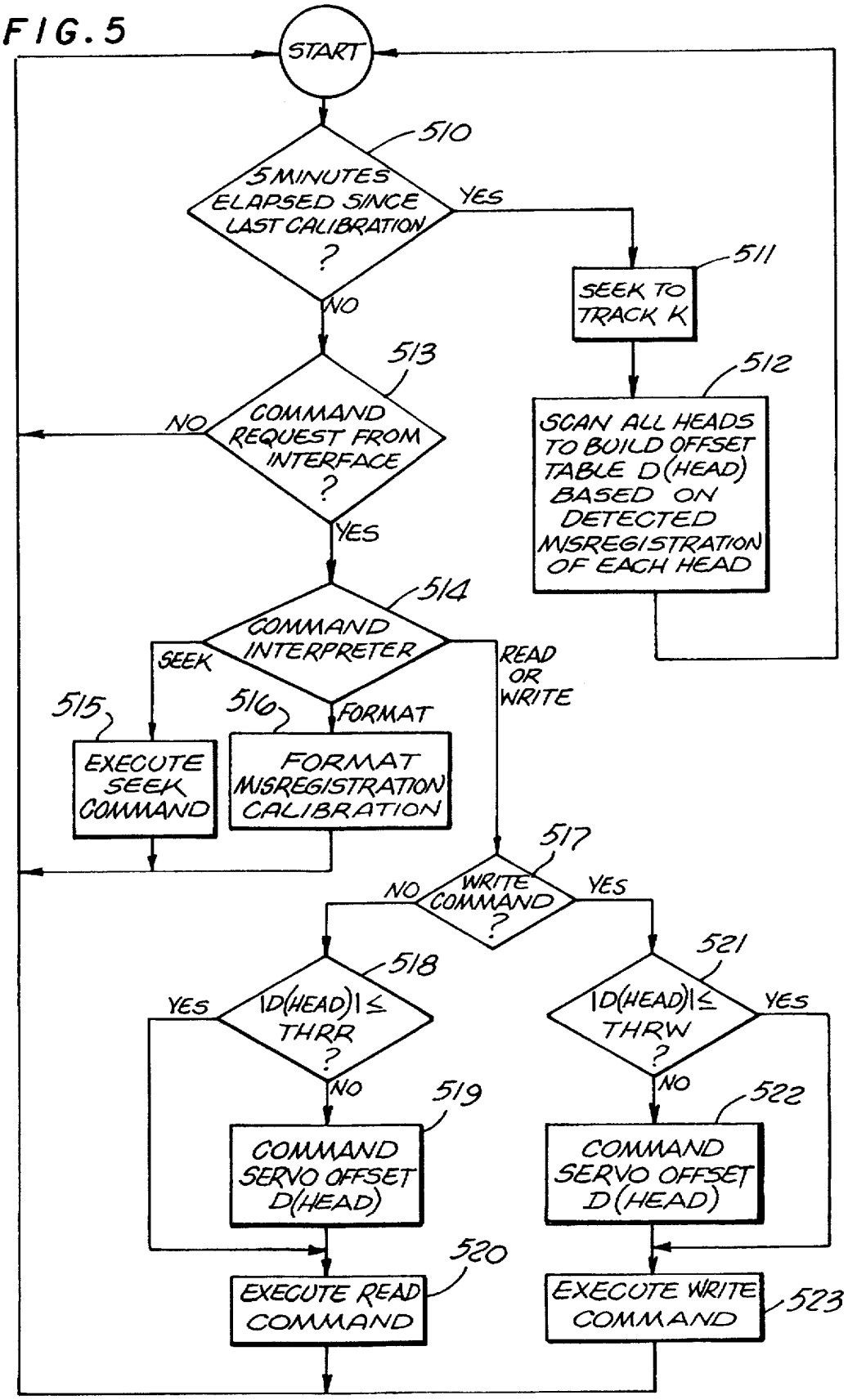
FIG. 5 shows a simplified flow chart of the microprocessor's microcode for use in the present invention.

FIG. 5 illustrates the control flow of the microcode within the microprocessor 6B which is responsible for performing correction of track misregistration. FIG. 5 is only representative, other methods of implementing the track misregistration correction are possible. Additionally, means for cancelling low-frequency repetitive effects caused, for example, by loss of disk eccentricity could be contemplated. A software idle loop continually checks for commands on the interface, while maintaining a timer which governs frequency of access to the misregistration calibration area. At predetermined intervals, the calibration areas are accessed. Each head is checked sequentially, the demodulator is cycled to measure the misregistration value, and a table indexed by head is constructed holding misregistration data. When a read or write command to a specific head is received, the table is consulted. If the misregistration is within a preset threshold, no head position correction is made. If the misregistration is outside the threshold bound, an appropriate position offset is commanded in the servo prior to the execution of the read or write command. Formatting of the misregistration calibration areas is accomplished by a special format command.

As shown in FIG. 5, at the beginning of the microcode loop, the microprocessor's internal timer is checked to see if a predetermined interval of time has passed since the last calibration was made (block 510). If the answer is yes, the data heads seek to track K where the servo calibration pattern is located (block 511). Then, all heads are scanned, sequentially, to build an offset table, D(head), based on the detected misregistration of each head (block 512). The loop returns to START.

If the answer is no, hence the predetermined interval has not elapsed since the last calibration, then the microcode checks to see if there is a command request from the interface (block 513). If there is no request, then operation returns to START. If there is a request, then operation proceeds to the command interpreter (block 514).

If the command is a seek command, then microcode executes the seek command (block 515) and returns to START. If the command is a format command, then the microcode commands the operation for formatting the misregistration calibration areas (block 516) and then returns to START. If the command is a read or write command then the microcode branches to a new decision block (517) to determine whether to read or write.

If the command is a write command, then a check of the misregistration calibration table is made (block 521) to see if the misregistration lies within the write threshold (THRW). If the misregistration does lie within the threshold then the write command is executed (block 523) and the microcode returns to START. If the misregistration is not within the threshold region then the microprocessor commands an appropriate offset in the servo (block 522) prior to the execution of the write command. The offset value is taken from the misregistration calibration table, D(head). After the offset is applied, the write command is executed and operation returns to START.

If the command is not a write command, then the misregistration calibration table is checked (block 518) to see if the offset value is within the read threshold value THRR. Note that THRW is normally less than THRR. If the value in D(head) is less than the threshold value, then the read command is executed (block 520) and operation returns to START. If the offset value is outside the threshold value, then the microprocessor commands the servo positioning system to reposition the head according to the offset value (block 519). The read command is then executed and operation returns to the start of the loop.

Figure 4:
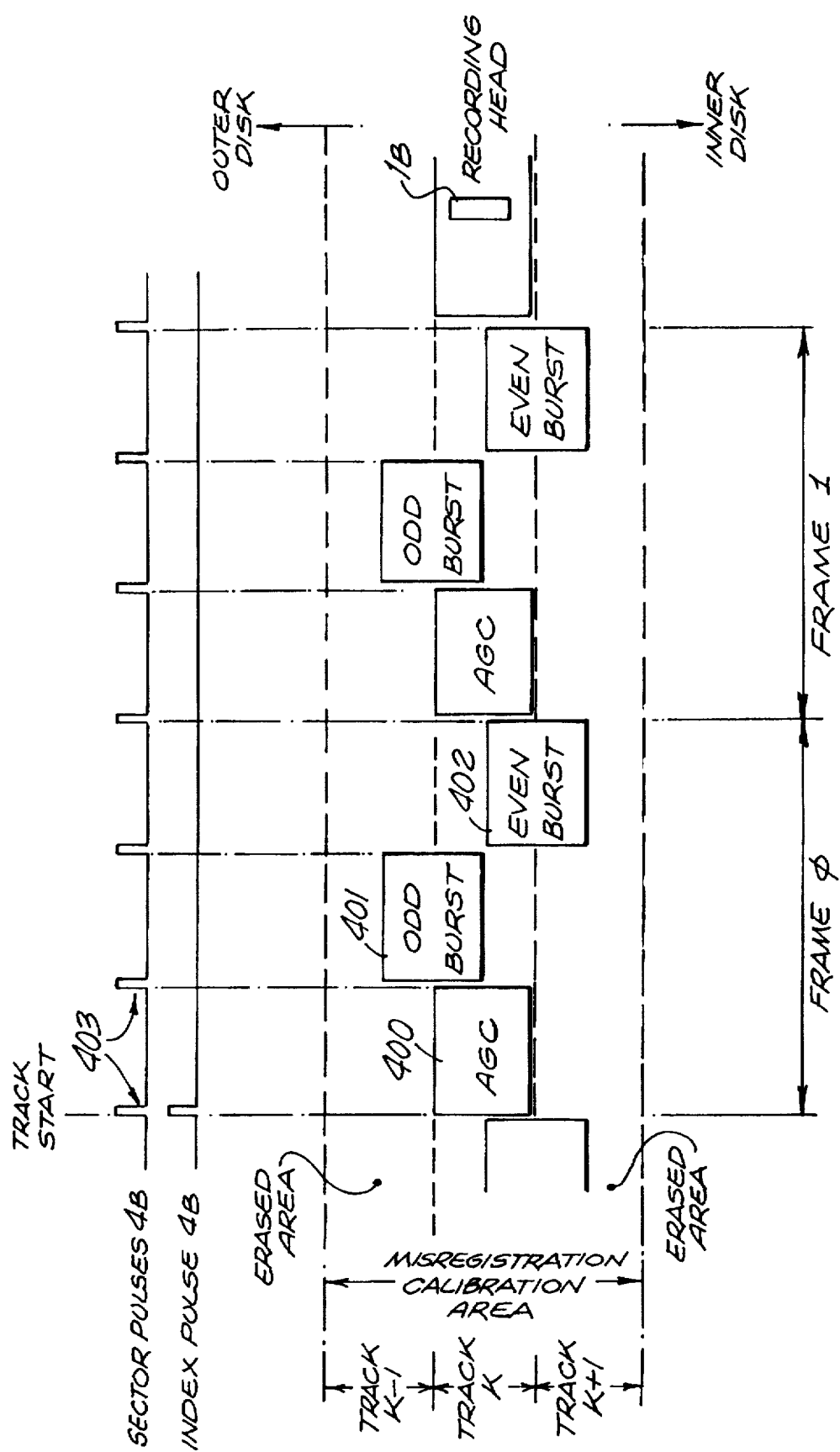
FIG. 4 illustrates a misregistration calibration area format for use with the present invention.

A misregistration calibration servo format is illustrated in FIG. 4. Misregistration calibration areas 1A are written by interface controller 6 upon receipt of an appropriate command over device interface 7, by appropriate sequencing of recording channel 2 and of servo 4. Use is made, in this operation, of the capability of the interface controller 6 to select varying sector lengths in dedicated servo system 4. Each calibration comprises three adjacent tracks K−1, K, and K+1, each of pitch equal to the data track pitch. The central track of the area is written with an arbitrary number of AGCBURST-ODDBURST-EVENBURST triplets. All bursts are recorded with a constant frequency tone. AGCBURSTs 400 are written with the recording head centered on track K. ODDBURST 401 and EVENBURST 402 position bursts are written with the recording head offset from track K center by nominally ½ of track towards the inner and outer diameter of the disk, respectively. Head offset is obtained by issuing an appropriate command to servo system 4.

The misregistration calibration area is d.c. erased by the interface controller prior to recording of the triplets; complete erasure is ensured by performing erasure with the head in both offset and on-track positions of tracksK−1,K, and K+1.

As shown in FIG. 4, each burst of a triplet is demarked by a sector pulse 403; accordingly, prior to recording the misregistration calibration areas, the interface controller commands the servo system to deliver a number (i.e. three: number of triplets per track) of sector pulses per track. This number is not necessarily the same as the number of sector pulses employed on data tracks.

The AGCBURST 400 provides a gain reference to reproduce channel 2; the gain thus established is held constant through the adjacent ODDBURST 401 and EVENBURST 402.

The ODDBURST 401 and EVENBURST 402 fields are used differentially in known fashion to sense the radial position of the recording head 1B; for example, outward displacement of the head 1B results in an increase in amplitude of ODDBURST and reduction in amplitude of EVENBURST. The sum of ODDBURST and EVENBURST amplitudes remain nominally constant for moderate displacement of the recording head from track center of track K, thus permitting the head displacement D to be calculated as, $$D = G \frac{(ODDBURST\ amplitude - EVENBURST\ amplitude)}{(ODDBURST\ amplitude + EVENBURST\ amplitude)}$$

where constant G is a function of the headwidth of the particular recording head.

Figure 6:
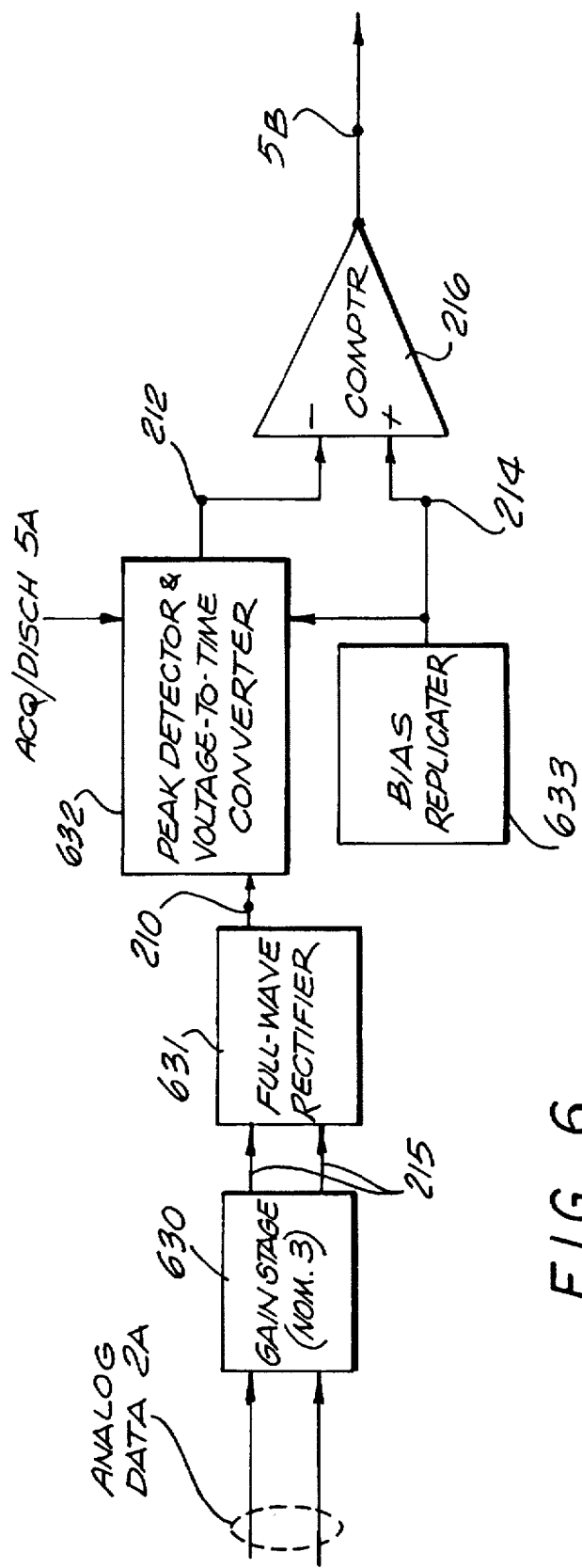
FIG. 6 illustrates a functional diagram of the servo demodulator of the present invention.
Figure 7:
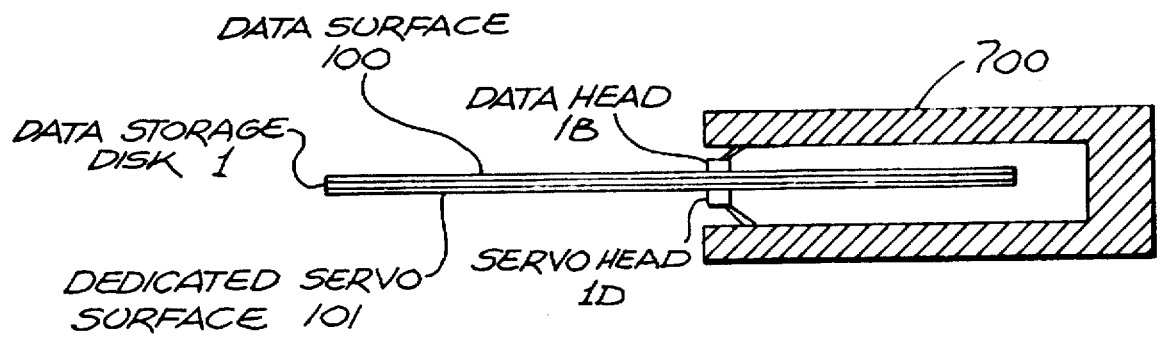
FIG. 7 illustrates a side view of the head/disk assembly of the present invention.
Figure 8:
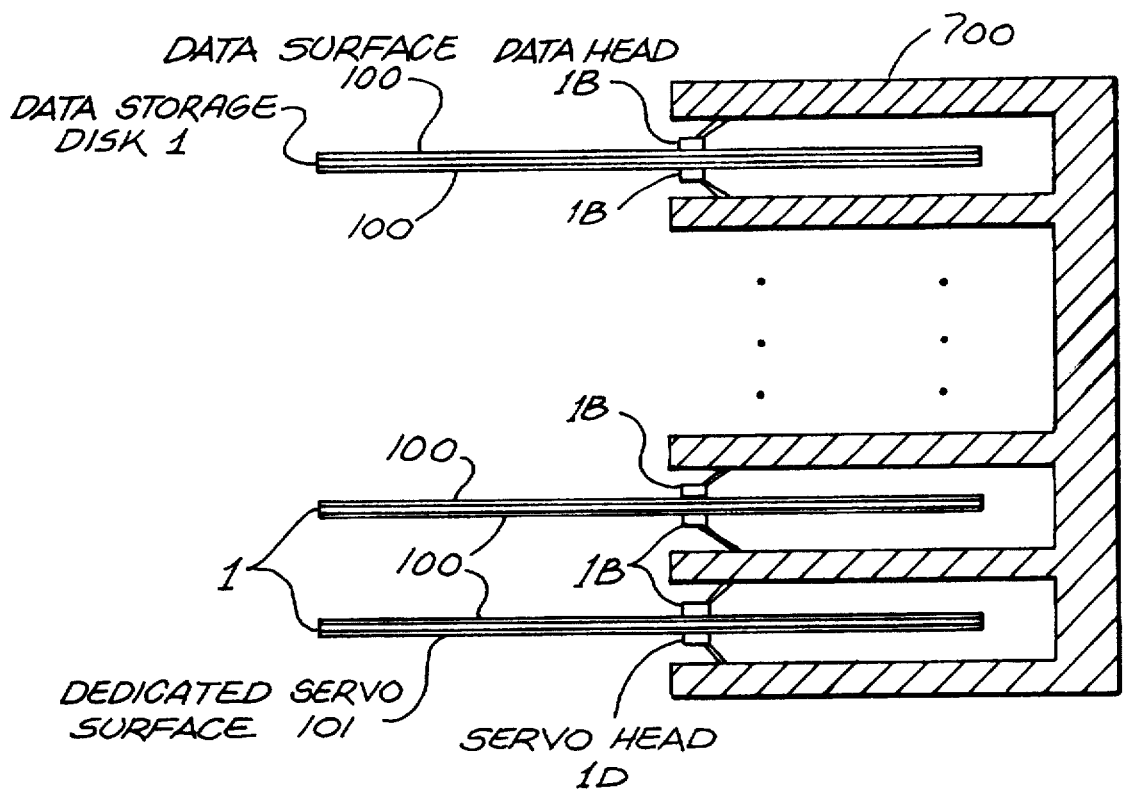
FIG. 8 illustrates a side view of a multiple disk embodiment of the head/disk assembly of the present invention.

A block diagram of the novel demodulator circuit of the present invention is illustrated in FIG. 6. The function of demodulator 5 is to produce a measure of the misregistration of a selected data recording head in reference to its associated misregistration calibration area. The demodulator of the present invention is made up of five stages: A gain stage 630, a full wave rectifier 631, a peak detector and voltage-to-time converter 632, a bias replicator circuit 633, and an analog comparator 216.

The analog read data from line 2A is passed through a gain stage 630, which has a nominal gain of three. The amplified output 215 of the gain stage is provided to full-wave rectifier 631 to supply rectified signal 210 to the peak detector and voltage-to-time converter 632. The peak detector and voltage-to-time converter 632 also receives the Acquire/Discharge signal 5A from the microprocessor 6B and the bias signal 214 from the bias replicator 633. The Acquire/Discharge signal 5A is used to control the voltage-to-time conversion. The bias signal 214 is utilized in clamping circuitry within the peak detector to prevent transistor saturation. The output 212 of the voltage-to-time converter is a voltage signal ramping down from the peak value at a constant rate. The signal 212 is provided to the negative input of comparator 216.

The bias replicator 633 outputs a constant reference voltage signal 214 equivalent to the value that signal 212 would have if the differential input on lines 2A was zero. The reference signal 214 is provided to the positive input f comparator 5F.

Comparator 5F produces binary digital output 5B. The falling edge of 5B is triggered as signal 212 rises above bias signal 214. The rising edge of signal 5B is triggered when the falling voltage 212 reaches the bias signal level.

Figure 2:
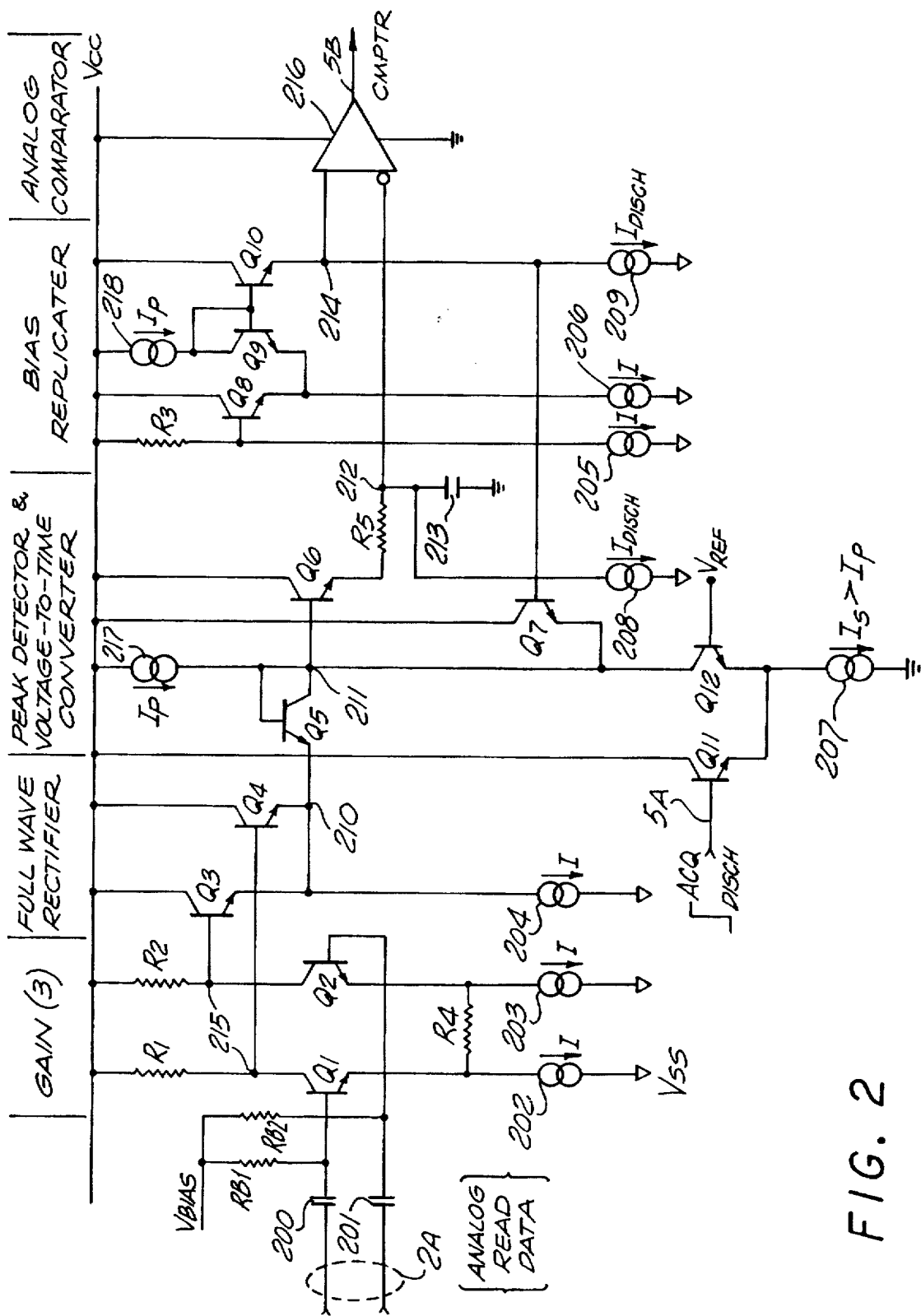
FIG. 2 illustrates the preferred embodiment of the servo demodulator of the present invention.

A circuit diagram of the demodulator is shown in FIG. 2. One of the differential input lines of analog read data 2A is coupled through capacitor 200 to the base of transistor Q1, and the other input line is coupled through capacitor 201 to the base of transistor Q2. The base of transistor Q1 and the base of transistor Q2 are coupled to a gain stage biasing voltage through bias resistances RB1 and RB2, respectively. The emitter of transistor Q1 and the emitter of transistor Q2 are coupled together through resistor R4, and the emitters of transistors Q1 and Q2 are also coupled to current sources 202 and 203, respectively. Current sources 202 and 203 are coupled to ground, VSS. The collector for Q1 is coupled to the supply voltage VCC through resistor R1 and is also coupled to the base of transistor Q4. The collector of Q2 is coupled to VCC through resistor R2 and also coupled to the base of transistor Q3.

The collector of transistor Q3 and the collector of transistor Q4 are coupled to VCC. The emitters of transistors Q3, Q4 and Q5 are coupled to node 210 which is in turn coupled through a third current source 204 to VSS.

The base and collector of transistor Q5 are coupled to node 211, as are the base of Q6, the emitter of transistor Q7, and the collector of transistor Q12. Connected between VCC and node 211 is current source 217 with a current value of Ip. The collector of transistor Q6 and the collector of transistor Q7 are coupled to VCC. The emitter of transistor Q6 is coupled through resistor R5 to node 212. Capacitor 213 is coupled between node 212 and VSS. Also coupled to node 212 and VSS is current source 208, which has a current value of $I_{DISCH}$. Node 212 is coupled to the negative input of comparator 216.

In the bias replicator circuit, the base of transistor Q8 is coupled through current source 205 to VSS and coupled through resistor R3 (R1=R2=R3) to VCC. The collector of transistor Q8 is coupled to VCC. The emitters of Q8 and Q9 are jointly coupled to current source 206, which is coupled to VSS. Current source 206 has a current value equivalent to that of current sources 202–205. The collector and base of transistor Q9 are coupled through current source 218, which has a current value equivalent to that of current source 217, to VCC.

The base of transistor Q10 is coupled to the base and collector of transistor Q9. The collector of Q10 is coupled to VCC and the emitter is coupled to node 214. Node 214 is coupled to the positive input of comparator 216 and to the base of transistor Q7. In addition, current source, 209 having a current value equivalent to that of current source 208, is coupled between node 214 and ground VSS. Note that, to ensure proper bias replication, R1=R2=R3; and Q8, Q9 and Q10 replicate the action of Q3/Q4, Q5 and Q6, respectively.

The emitter of transistor Q11 and the emitter of transistor Q12 are jointly coupled to current source 207 of value Is (Is>$I_P$), which is coupled to VSS. The base of transistor Q12 is coupled to a reference voltage, and the base of transistor Q11 is coupled to the acquire/discharge signal on line 5A. The collector of transistor Q11 is coupled to VCC.

Transistors Q1, Q2, Q3 and Q4 form a gain stage followed by a full wave rectifier. The gain stage receives a differential signal from the recording channel 2 over wires 2A. The amplified output 34 of the gain stage is taken from the collectors of transistors Q1 and Q2.

Transistors Q5, Q6, Q11 and Q12 comprise a single-gated peak-hold circuit, the state of which is controlled by the acquire/discharge mode logic signal 5A. Transistor Q7 damps the base of transistor Q6 and collector of transistor Q12 to prevent saturation and zenering of the base-emitter junction of transistor Q6. In the acquire mode of the peak-hold circuit, capacitor 213 is allowed to charge up to the signals peaks through transistor Q6, which functions essentially as an emitter follower, with trickle emitter currents set by the $I_{DISCH}$ discharge current source 208. When the peak-hold circuit is set into hold mode, the base-emitter junction of transistor Q6 is forced into reverse-bias, whereupon capacitor 213 commences to discharge linearly under influence of constant-current source 208.

Comparator 216 signals on wire 5B when capacitor 213 has been discharged to a reference level established by transistors Q8, Q9, Q10 and their associated biasing current sources. This transistor network operates as a replica bias circuit which ensures that the potential on the non-inverting input of the comparator closely tracks the potential which capacitor 213 would assume in the absence of an input signal on wires 2A. The output 5B from the comparator 216 is a binary digital waveform.

Shown in FIG. 3 are waveforms pertinent to operation of the demodulator 5. These wave shapes are illustrated for the case of recording head 1D displaced inward relative to track center in the misregistration calibration area. Accordingly, the reproduced ODDBURST 401 is shown of smaller amplitude then the associated EVENBURST 402. Waveform [A] illustrates the analog read data appearing on wires 2A when the misregistration calibration is being read. Signal [B] toggles high in the AGC field to freeze AGC gain during the subsequent two position burst fields. Signal [C] is pulsed high in each position field to control acquisition and discharge of the peak values of the ODDBURST and EVENBURST fields. Shown at [D] and [E], respectively, are the potential across capacitor 213 in the demodulator and the logic signal output of comparator 216. Signals [B] and [C] are generated by microprocessor 6B. Signal [E] is applied to the event capture timer 6C of microprocessor 6B.

Microprocessor 6B of FIG. 1 employs event capture timer 6C to measure for each ODDBURST 401 and EVENBURST 402 field the time interval between the switching of demodulator 5 into discharge mode (fall of waveform [C], and completion of discharge as marked by rise of the comparator output 5B (rise of waveform [E]).

For a capacitor, I=CdV/dt. When integrated, this provides, in the case of the demodulator, $V_{PEAKWOOD} = T_{ODD}(I_{DISCH}/C)$ and $V_{PEAKEVEN} = T_{EVEN}(I_{DISCH}/C)$.

The magnitude of the discharge current, $I_{DISCH}$, from current source 208, divided by the magnitude of capacitor 213 forms a common multiplying factor of both peak voltage equations. Accordingly, the magnitude of $I_{DISCH}$ and of C are not critical. Substituting these peak voltage equations into the original misregistration equation allows for the ($I_{DISCH}/C$) term to be cancelled from the expression for D. The position misregistration, D, can be calculated within the microprocessor using the modified formula, $$D = G \frac{(T_{ODD} - T_{EVEN})}{(T_{ODD} + T_{EVEN})}$$

The demodulator 5 thus functions as a voltage-to-time converter in demodulating burst amplitudes.

Thus a means for detection of data track misregistration is described.

We claim:

1. An apparatus for detecting data track misregistration comprising:

a servo denodulator for receiving a differential analog input from a data channelling means, and for receiving a first control signal from a microprocessor; said demodulator for providing a first binary signal;

said microprocessor for receiving said first binary signal from said demodulator,and for receiving a status signal and a plurality of pulses from a dedicated servo system; and for providing a command signal to said servo system; said microprocessor for providing an automatic gain control hold signal to said data channelling means, and for providing said first control signal to said demodulator; said microprocessor coupled to a data controlling means;

said data controlling means receiving said pulses from said servo system; said data controlling means coupled to said data channelling means to transmit and receive a data signal and to provide a clock signal; said data controlling means coupled to a device interface; said data controlling means and said microprcessor comprising an interface controller for governing communication between a disk file and said device interface;

said disk file having at least one data surface and a servo position reference surface; each one of said data surfaces containing at least one misregistration calibration area;

a data head positioned adjacent each one of said data surfaces for reading data from said data surface and writing data to said data surface; said data head coupled through an amplifying means to said channeling means;

a servo head positioned adjacent said servo position reference surface for reading servo information from said servo position reference surface; said servo head coupled through a servo amplifying means to said servo system;

a head positioning system for supporting and positioning said data heads and said servo head in a synchronized fashion in response to a positioning signal received from said servo system;

wherein said misregistration calibration area comprises:
  a first signal burst centered on disk track, K;
  a second signal burst following said first signal burst, overlapping one-half of said track K and one-half of an adjacent outer track, K−1;
  a third signal burst following said second signal burst, overlapping one-half of said track K and one-half of an adjacent inner track, K+1;
  wherein a plurality of said misregistration calibration areas form an offset calibration track; at least one of said offset calibration tracks disposed at fixed inner and outer radii on all of said data surfaces;

wherein said microprocessor contains a timing means; said timing means initiated by said first control signal and stopped by said first binary signal; said timing means containing a time value, T.

2. The apparatus of claim 1, wherein said microprocessor implements two sequential time values, $T_1$ and $T_2$, obtained from said timing means, in a calculation for a track misregistration value, D, according to the equation:

$$D = G \frac{T_2 - T_1}{T_1 + T_2}$$

where G is a function of the width of said data head.

3. An apparatus for detecting data track misregistration comprising:
  a servo demodulator for receiving a differential analog input from a data channelling means, and for receiving a first control signal from a microprocessor; said demodulator for providing a first binary signal;
  said microprocessor for receiving said first binary signal from said demodulator, and for receiving a status signal and a plurality of pulses from a dedicated servo system; and for providing a command signal to said servo system; said microprocessor for providing an automatic gain control hold signal to said data channelling means, and for providing said first control signal to said demodulator; said microprocessor coupled to a data controlling means;
  said data controlling means receiving said pulses from said servo system; said data controlling means coupled to said data channelling means to transmit and receive a data signal and to provide a clock signal; said data controlling means coupled to a device interface; said data controlling means and said microprocessor comprising an interface controller for governing communication between a disk file and said device interface;
  said disk file having at least one data surface and a servo position reference surface; each one of said data surfaces containing at least one misregistration calibration area;
  a data head positioned adjacent each one of said data surfaces for reading data from said data surface and writing data to said data surface; said data head coupled through an amplifying means to said data channeling means;
  a servo head positioned adjacent said servo position reference surface for reading servo information from said servo position reference surface; said servo head coupled through a servo amplifying means to said servo system;
  a head positioning system for supporting and positioning said data heads and said servo head in a synchronized fashion in response to a positioning signal received from said servo system;
  wherein said demodulator comprises:
    a gain stage for receiving said differential analog input and providing an amplified signal;
    a rectifying means for receiving said amplified signal and providing a rectified signal;
    a peak detector and voltage-to-time converter for receiving said rectified signal and providing a ramp signal in response to said first control signal received from said microprocessor;
    a bias circuit for providing a comparison signal;
    a comparator for receiving said ramp signal and said comparison signal, and providing said first binary signal to said microprocessor.

4. An apparatus for detecting and compensating for data track misregistration comprising:
  at least one misregistration calibration area located on at least one data surface;
  detecting and demodulating means for detecting a plurality of calibration signals extracted from said misregistration calibration area, and for providing timing pulses proportional to a peak voltage value of said calibration signals;
  processing means receiving said timing pulses, and calculating a misregistration offset value therefrom; for storing a plurality of said misregistration offset values in an offset table referenced by data head; for checking said offset table, prior to read and write operations, to determine whether said misregistration offset value for a selected data head is less than a threshold value; for commanding a servo offset prior to execution of said read or write command, if said misregistration offset value is greater than said threshold value; for initiating a scan of said data heads, at intervals, to determine track misregistration;
  a disk drive servo system responsive to said processing means for positioning said data heads over said misregistration calibration areas during said scan; and for repositioning said data heads, when commanded by said processing means, by said misregistration offset value;
  wherein said detecting and demodulating means comprises:
    data channeling means for receiving the calibration signals read from said misregistration calibration area by said data head and for providing said calibration signals to a rectifying means;
    said rectifying means for receiving said misregistration signal from said channeling means and providing a rectified signal;
    a voltage-to-time conversion means for receiving said rectified signal and extracting a peak voltage value of said rectified signal; and for providing a ramp voltage signal dependent on said peak voltage value;
    bias replication means for providing a constant voltage signal;
    comparing means for receiving said ramp voltage signal and comparing said ramp voltage signal with said constant voltage signal; and for providing said timing pulses.

5. The detecting and demodulating means of claim 4 further including:

a gain stage coupled between said data channeling means and said rectifying means, wherein said data misregistration value is received from said channeling means and provided to said rectifying means at an amplified value.

6. An apparatus for detecting and compensating for misregistration between data heads in data tracks formed on recording media, said apparatus comprising:

at least one misregistration calibration area located on at least one surface of said data recording media;

detecting and demodulating means coupled to said data heads for reading said misregistration calibration area and detecting track misregistration by providing timing pulses, said timing pulses corresponding to a time difference dependent on a first control signal and an output signal of said detecting and demodulating means;

said processing means coupled to said detecting means for calculating a misregistration offset value from respective durations of said timing pulses;

memory means coupled to said processing means for storing an offset table of misregistration offset values generated by said processing means;

comparing means coupled to said memory means for comparing said misregistration offset values of said offset table with a threshold value;

offset generating means coupled to said comparing means for generating an offset correction value when one of said misregistration offset values of said offset table exceed said threshold value.

7. An apparatus for detecting data track misregistration comprising:

a servo demodulator for receiving a differential analog input from a data channeling means, and for receiving a first control signal from a microprocessor; said demodulator for providing an output signal;

said microprocessor for receiving said output signal from said demodulator, and for receiving a status signal and a plurality of pulses over time from a dedicated servo system; and for providing a command signal to said servo system; said microprocessor for providing an automatic gain control hold signal to said data channeling means, and for providing said first control signal to said demodulator; said microprocessor coupled to a data controlling means, said microprocessor further containing a timing means, said timing means indicating a time difference dependent on said first control signal and said output signal of said detecting and demodulating means;

said data controlling means receiving said pulses from said servo system; said data controlling means coupled to said data channeling means to transmit and receive a data signal and to provide a clock signal; said data controlling means coupled to a device interface; said data controlling means and said microprocessor comprising an interface controller for governing communication between a disk file and said device interface;

said disk file having at least one data surface and a servo position reference surface; each one of said data surfaces containing at least one misregistration calibration area;

a data head positioned adjacent each one of said data surfaces for reading data from said data surface and writing data to said data surface; said data head coupled through an amplifying means to said data channeling means;

a servo head positioned adjacent said servo position reference surface for reading servo information from said servo position reference surface; said servo head coupled through a servo amplifying means to said servo system;

a head positioning system for supporting and positioning said data heads and said servo head in a synchronized fashion in response to a positioning signal received from said servo system.

8. An apparatus for detecting and compensating for data track misregistration comprising:

at least one misregistration calibration area located on at least one data surface;

detecting and demodulating means for detecting a plurality of calibration signals extracted from said misregistration calibration area, and for providing timing pulses proportional to a peak voltage value of said calibration signals, said timing pulses corresponding to a time difference dependent on a first control signal and an output signal of said detecting and demodulating means;

said processing means receiving said timing pulses, and calculating a misregistration offset value therefrom; for storing a plurality of said misregistration offset values in an offset table referenced by data head; for checking said offset table, prior to read and write operations, to determine whether said misregistration offset value for a selected data head is less than a threshold value; for commanding a servo offset prior to execution of said read or write command, if said misregistration offset value is greater than said threshold value; for initiating a scan of said data heads, at intervals, to determine track misregistration;

a disk drive servo system responsive to said processing means for positioning said data heads over said misregistration calibration areas during said scan; and for repositioning said data heads, when commanded by said processing means, by said misregistration offset value.

9. An apparatus for detecting data track misregistration comprising:

a servo demodulator for receiving a differential analog input from a data channeling means, and for receiving a first control signal from a microprocessor; said demodulator for providing an output signal, said servo demodulator further comprising:

a gain stage for receiving said differential analog input and providing an amplified signal;

a rectifying means for receiving said amplified signal and providing a rectified signal;

a peak detector and voltage-to-time converter for receiving said rectified signal and providing a ramp signal in response to said first control signal received from said microprocessor;

a bias circuit for providing a comparison signal;

a comparator for receiving said ramp signal and said comparison signal, and providing said output signal comparison signal, and providing said output signal from said demodulator to said microprocessor;

said microprocessor for receiving said output signal from said demodulator, and for receiving a status signal and a plurality of pulses over time from a dedicated servo system; and for providing a command signal to said servo system; said microprocessor for providing an automatic gain control hold signal to said data channeling means, and for providing said first control signal to said demodulator; said microprocessor coupled to a data controlling means;

said data controlling means receiving said pulses from said servo system; said data controlling means coupled to said data channeling means to transmit and receive a data signal and to provide a clock signal; said data controlling means coupled to a device interface; said data controlling means and said microprocessor comprising an interface controller for governing communication between a disk file and said device interface;

said disk file having at least one data surface and a servo position reference surface; each one of said data surfaces containing at least one misregistration calibration area;

a data head positioned adjacent each one of said data surfaces for reading data from said data surface and writing data to said data surface; said data head coupled through an amplifying means to said data channeling means;

a servo head positioned adjacent said servo position reference surface for reading servo information from said servo position reference surface; said servo head coupled through a servo amplifying means to said servo system;

a head positioning system for supporting and positioning said data heads and said servo head in a synchronized fashion in response to a positioning signal received from said servo system.

10. An apparatus for detecting and compensating for data track misregistration comprising:

at least one misregistration calibration area located on at least one data surface;

detecting and demodulating means for detecting a plurality of calibration signals extracted from said misregistration calibration area, and for providing timing pulses proportional to a peak voltage value of said calibration signals, said detecting and demodulating means comprising:

data channeling means for receiving the calibration signals read from said misregistration calibration area by said data head and for providing said calibration signals to a rectifying means;

said rectifying means for receiving said misregistration signal from said channeling means and providing a rectified signal;

a voltage-to-time conversion means for receiving said rectified signal and extracting a peak voltage value of said rectified signal; and for providing a ramp voltage signal dependent on said peak voltage value;

bias replication means for providing a constant voltage signal;

comparing means for receiving said ramp voltage signal and comparing said ramp voltage signal with said constant voltage signal; and for providing said timing pulses;

processing means receiving said timing pulses, and calculating a misregistration offset value therefrom; for storing a plurality of said misregistration offset values in an offset table referenced by data head; for checking said offset table, prior to read and write operations, to determine whether said misregistration offset value for a selected data head is less than a threshold value; for commanding a servo offset prior to execution of said read or write command, if said misregistration offset value is greater than said threshold value; for initiating a scan of said data heads, at intervals, to determine track misregistration;

a disk drive servo system responsive to said processing means for positioning said data heads over said misregistration calibration areas during said scan; and for repositioning said data heads, when commanded by said processing means, by said misregistration offset value.

* * * * *

UNITED STATES PATENT AND TRADEMARK OFFICE
CERTIFICATE OF CORRECTION

PATENT NO. : 5,781,360
DATED : July 14, 1998
INVENTOR(S) : Wilson et al.

It is certified that error appears in the above-identified patent and that said Letters Patent is hereby corrected as shown below:

In column 10, line 3 of Claim 1, "denodulator" should be deleted and --demodulator-- inserted therefor.

Signed and Sealed this

Sixth Day of October, 1998

*Attest:*

BRUCE LEHMAN

*Attesting Officer*   *Commissioner of Patents and Trademarks*